March 1, 1966 L. JULIE 3,238,443
UNI-DIRECTIONAL CURRENT SUPPLY AND MEASURING MEANS
Filed Nov. 19, 1962 3 Sheets-Sheet 1

INVENTOR.
LOEBE JULIE
BY
ATTORNEY

March 1, 1966　　　　　L. JULIE　　　　　3,238,443
UNI-DIRECTIONAL CURRENT SUPPLY AND MEASURING MEANS
Filed Nov. 19, 1962　　　　　　　　　　　　3 Sheets-Sheet 2
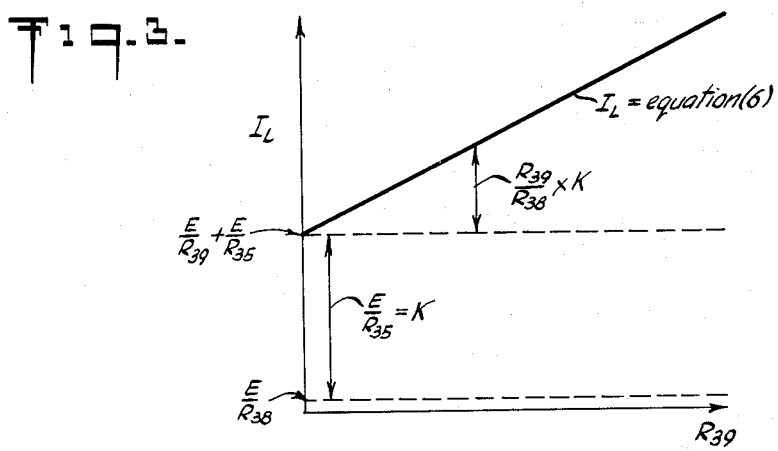
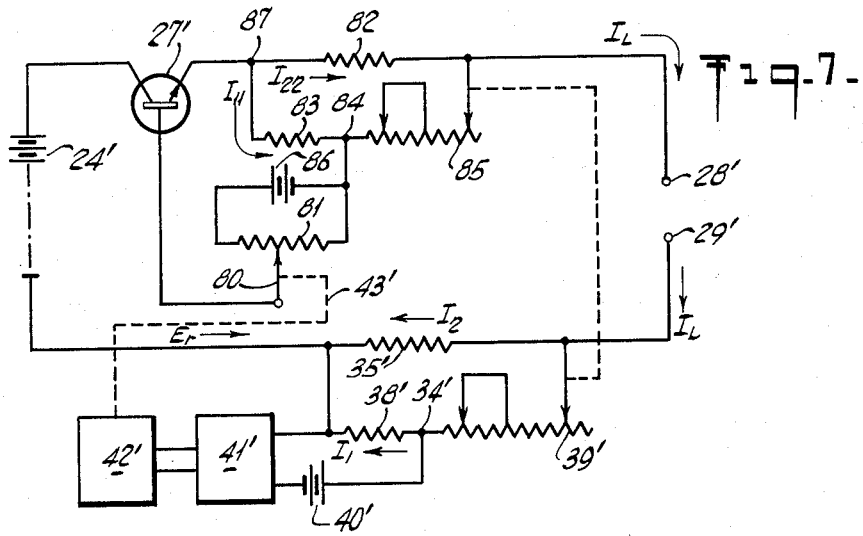
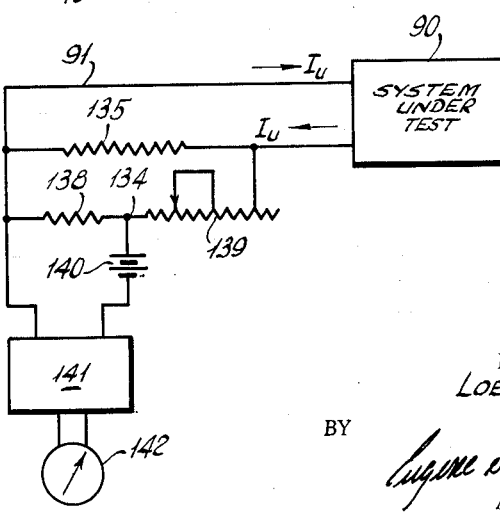
INVENTOR.
LOEBE JULIE
BY
*Eugene S. Lovette*
ATTORNEY.

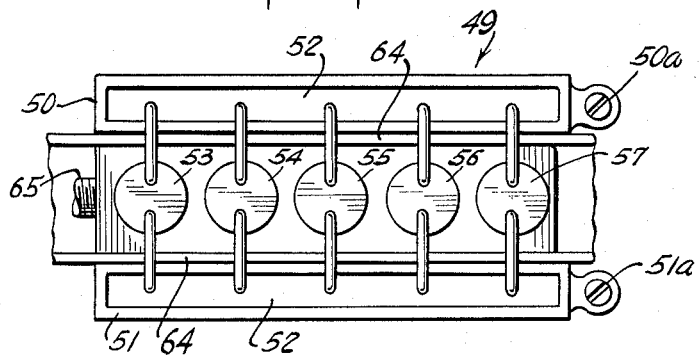
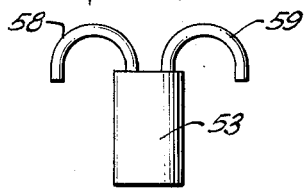
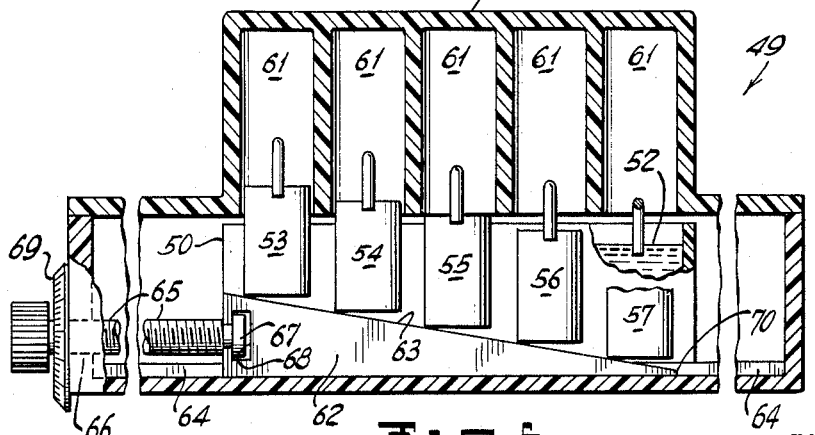

United States Patent Office 3,238,443
Patented Mar. 1, 1966

3,238,443
UNI-DIRECTIONAL CURRENT SUPPLY AND
MEASURING MEANS
Loebe Julie, New York, N.Y., assignor to Julie Research
Laboratories, Inc., New York, N.Y., a corporation of
New York
Filed Nov. 19, 1962, Ser. No. 238,543
9 Claims. (Cl. 323—66)

The instant invention relates to improved methods and means for providing an ultrastable adjustable uni-directional current supply and means for measuring uni-directional currents wherein said means, supply and system are characterized by extremely high accuracies in the order of a few parts per million.

The requirements for direct current supplies has increased in recent years, particularly, for D.C. current sources characterized by high stability and error accuracies within one or two parts per million. The calibration, meansurement and supply of precision direct current energy involves techniques dealing with fundamental units of voltage and the ohm. Standardized resistors and uni-directional reference sources of extremely high stability and accuracies are available to provide a network for supplying a fixed selected uni-directional current. Such systems generally incorporate self-regulation in order to maintain the established current within a very small percentage of error during system operation. For example, a known resistor may be placed in series with the output load, whereby the voltage drop across said resistor is monitored against a certified standard cell or Zener reference. If the resistance is highly accurate and with the use of a certified voltage standard, the current flow through the resistance may be ascertained within a very small percentage of error and, further, such current may be regulated to compensate for drift if the compared voltages show an error. The error signal may be fed to a servo-mechanism for the purpose of varying a current resistance valve in series with the load, or a rheostat divider for the purpose of varying the uni-directional voltage applied to the load.

The foregoing apparatus is satisfactory for a preset fixed current system. Accuracy and stability limitations arise when this type of circuit is modified by inserting variable elements in the monitoring circuit to provide a selected D.C. current source over a range of operating currents, i.e. for a system capable of providing a given current selected from a relatively wide range of current operation. In order to provide means of high degree of performance as hereinbefore noted, the present invention makes use of a novel method and combination of precision resistors, a stable and accurate primary standard resistor and a certified D.C. source which can be relied upon for providing a variable D.C. current source characterized by ultrastability and accuracy within 1 part per million or better.

It is, therefore, the principal object of the invention to provide a relatively simple and reliable method and means for producing a preset uni-directional current characterized by an ultrastability and accuracy within 1 part per million for any selected current in a given range of current operation.

It is a further object of the invention to provide improved method and means providing a uni-directional current source wherein the range of current supplied may be readily changed without sacrificing the high stability and accuracy performance characteristics hereinbefore noted and wherein a given value of current within the preselected range of operation may be readily selected and maintained with such high degree performance characteristics.

It is a further object of this invention to provide method and means for monitoring and/or measuring within extreme precisions and stabilities, the value of a uni-directional current under test.

It is a further object of the invention to provide a simple structure for providing a variable conductance element.

Further objects and advantages will become apparent from the following description of the invention taken in conjunction with the figures, in which:

FIG. 3 depicts a curve used to explain the invention;

FIGS. 4, 5 and 6 depict, respectively, a standard primary resistor, a plurality of such resistors for forming a conductance device, and in FIG. 6, improved means for lifting and lowering the individual resistors so as to change resistance values without discontinuities occurring;

FIG. 7 illustrates a schematic of a second embodiment of the invention for providing a variable uni-directional current source; and FIG. 8 illustrates a schematic of a monitoring and measuring network in accordance with the invention.

Figure 1:
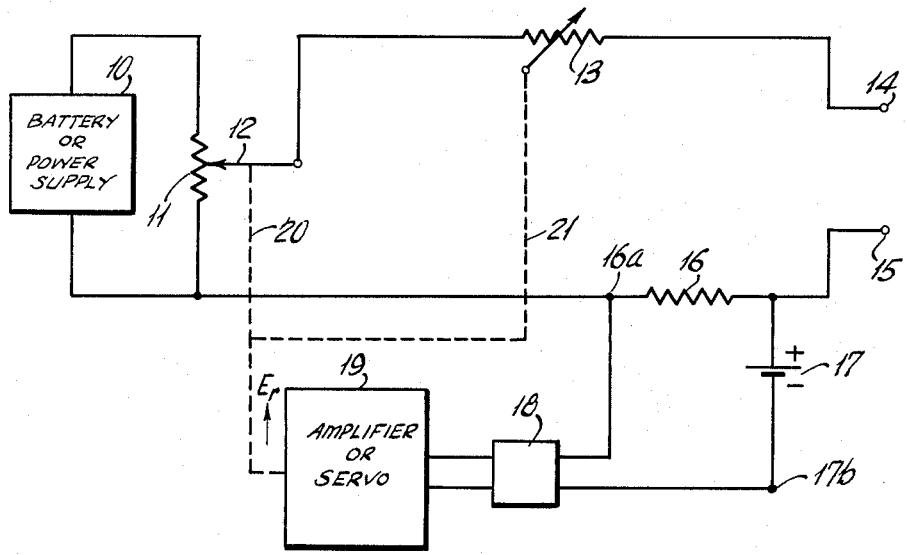
FIG. 1 is a schematic illustration of a network providing a selected D.C. current of extremely high stability performance, but not capable of matching such performance for a selected current within a wide range of current operation; the figure is set forth herein to facilitate explanation of the invention.

Reference is now made to FIG. 1 wherein a D.C. power source 10, a battery or power supply, is connected across the outer terminals of a voltage divider 11. The load circuit is supplied from a divider arm 12 and one side of divider rheostat 11. The load (not shown) is applied to output terminals 14 and 15. The circuit includes a load current variable resistor 13 in series with terminals 14, 15 and a current sensitive standard resistor 16. Load current is monitored by comparing the voltage drop across resistor 16 against a standard D.C. cell or zener reference supply voltage 17. This is achieved by an accurate null detector and amplifier 18 which is connected across junctions 16a and 17b. Detector-amplifier 18 produces an output corrective error signal corresponding to the deviation from reference voltage 17.

In order that the foregoing comparison circuit function as a self-regulating system, the voltage sensed by device 18 is coupled into the input of amplifier-servo means 19. A feedback error signal $E_r$ of suitable phase and magnitude is produced by servo means 19. The feedback circuit may be either mechanical or electro-mechanical of any known design and coupled either to voltage divider arm 12 or to variable resistor 13, or to both elements. This is depicted by dashed lines 20, 21, respectively. Regulation of divider arm 23 adjusts the load circuit voltage supplied to the load to achieve a null at meter 18, whereas regulation of resistor 13 adjusts load current to obtain such null. The value of resistance 16 is selected to provide a null at meter 18 at the desired load current.

The foregoing system is capable of accurate and stable performance as a standard D.C. current source, but only for fixed current operation in contrast to a variable current operation. For example, upon the selection of a fixed load current and the value of resistance for resistor 16, the voltage drop across resistor 16 is preset. Said voltage drop is equal and opposite in phase with respect to the preset reference voltage 17 in order to balance device 18. A slight drift caused by an increase or decrease of load current from its preset value gives rise to an error signal $E_r$ which results in regulation of divider arm 12, resistor 13 or both for correcting the current drift.

The foregoing circuit may be modified to provide a variable direct current source. The modification involves the use of a variable resistor in place of standard resistor 16 or replacement of fixed voltage reference 17 by a variable reference voltage. System accuracy of such variable D.C. source would be a function of the network loop including the rheostat in place of resistor 16, device 18 and the variable D.C. reference in place of fixed supply 17. Standard resistors characterized by accuracies of 1 part per million are obtainable, but variable high power resistors or variable primary D.C. references of such accuracies and ultrastabilities are extremely difficult to achieve. Consequently, the foregoing modification of FIG. 1 is not suitable to provide ultrastable and high accuracy operation in the order of a few parts per million.

Figure 2:
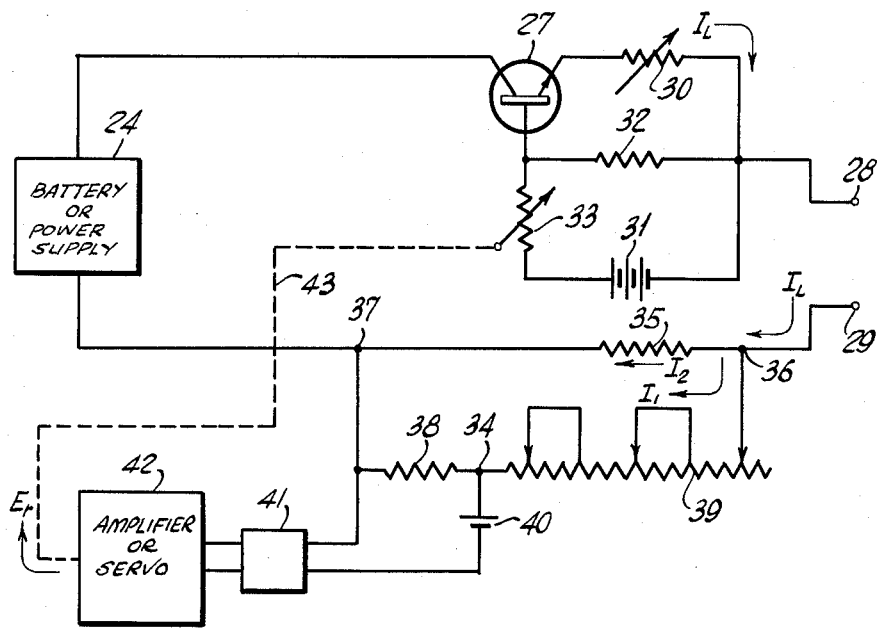
FIG. 2 illustrates a schematic of the network in accordance with the principles of the invention.

FIG. 2 illustrates a variable D.C. current source in accordance with the principles of the invention. The circuit of FIG. 2 is capable of providing the high degree of ultrastable operation with 1 part per million accuracy for a desired range of load currents. This system also has the advantage of including coarse adjustment regulation as well as servo feedback regulation. The circuit of FIG. 2 includes a D.C. power source 24, a battery or power supply, connected to the load circuit. Power source 24 feeds load current through a current regluating network comprising transistor 27 and a variable resistor 30 connected in series with the load. The load (not shown) is applied across output terminals 28, 29. The transistor emitter circuit includes the variable resistor 30 connected to load terminal 28. Transistor bias is supplied by a battery 31 and a resistor divider network including resistance 32 and variable resistance 33. A current sensitive primary standard resistor 35 is connected between junctions 36, 37. Resistor 35 corresponds to resistor 16 of FIG. 1. Resistor 35 is bridged by a resistance branch consisting of a precision resistor 38 connected at 34 to one end of a precision rheostat 39. Resistor 35 is an absolute standard characterized by 1 part per million accuracy and absolute stability. Since resistors 38, 39 are designed for low current and power capacities, precision parameter characteristics therefor are achievable. As will be seen hereinafter, the network is devised so that the branch current $I_1$ through $R_{39}$ and $R_{38}$ is very small; whereas almost the full load current flows through fixed resistor 35. Monitoring is achieved by comparing the voltage drop across resistor 38 against a fixed voltage, such as a primary standard D.C. cell or zener reference supply 40. Balance is indicated by null detector-amplifier device or meter 41 connected on one side to junction 37, the common ends of resistors 35 and 38. The other input side of null device 41 is connected to the negative side of cell 40. In order that the foregoing comparison circuit function as a self-regulating system, a compensating error signal corresponding to the plus or minus difference voltage sensed by device 41 is coupled into the input of amplifier-servo means 42. A feedback error signal $E_r$ of suitable phase and magnitude is produced by means 42 which is directly related to the magnitude and phase of the voltage difference between cell 40 and the voltage drop across resistor 38. This error signal may be either mechanical or electromechanical and is coupled to regulate the biasing trim resistor 33 up or down as depicted by line 43. This regulation of transistor bias adjusts the value of the load current $I_L$ passed by transistor 27 to achieve a balance which is then indicated by a null error signal at device 41. Transistor 27 functions as a variable resistance valve.

With the circuit as shown in FIG. 2 and designating the voltage of standard reference 40 as "E" and the voltage drop across resistor 38 as "$V_{38}$," the following relationships obtain at balance, that is to say, voltage "E" is equal but opposite to voltage "$V_{38}$" as indicated by meter 41 null. Branch current $I_1$ through resistor 38 is:

$$I_1 = \frac{E}{R_{38}} \qquad (1)$$

The same value of current flows through divider rheostat 39, whereby the voltage drop "$V_{39}$" across rheostat 39 is:

$$V_{39} = I_1 \times R_{39} = \frac{E}{R_{38}} \times R_{39} \qquad (2)$$

The voltage drop "$V_{35}$" across standard resistor 35 equals the sum of the drops across resistor 38 and rheostat 39 and at meter 41 balance:

$$V_{35} = E + \frac{E}{R_{38}} \times R_{39} = E\left[\frac{R_{38} + R_{39}}{R_{38}}\right] \qquad (3)$$

Whereby, the current flow $I_2$ through resistor 35 is:

$$I_2 = \frac{E}{R_{35}}\left[\frac{R_{38} + R_{39}}{R_{38}}\right] \qquad (4)$$

The total current flow through the load, $I_L$, is the sum of the two branch currents:

$$I_L = I_1 + I_2 \qquad (5)$$

In the practice of the invention, the value $R_{38}$ of resistor 38 is very much larger than the value $R_{35}$ of resistor 35. Consequently, the greater portion of load current flows through the branch resistor 35 as $I_2$. The amount of load current branching off as $I_1$ is very small compared to $I_2$ and $I_L$. Hence, resistors 38, 39 need not be designed for high power and high current ratings. This contributes to the accuracy and stability characteristics of $R_{38}$, $R_{39}$. As an example, the following values are used to depict an operating network employing the invention:

E (source 40) is a primary standard of 3 volts, 1 part per million accuracy and stability;

$R_{35}$ is a primary standard of 100 ohms, 1 part per million accuracy and stability; and $R_{38}$ and $R_{39}$ are precision resistors of the same composition and form a decade; in particular, the precision ratio decade $R_{39}/R_{38}$ is designed to provide a fixed resistance $R_{38}$ of 30,000 ohms and stepped values of resistance $R_{39}$ from zero ohms to 70,000 ohms.

The current values of the network for balance at meter 41 is shown for three settings of $R_{39}$. When $R_{39}$ is set at zero ohms, branch current $$I_2 = \frac{3 \text{ volts}}{100\Omega} = .03 \text{ amp.}$$

From Equation 1, $$I_1 = \frac{3}{30,000} = 0.1 \text{ milliamp.}$$

Hence, load current $I_L = 30.1$ milliamps. When $R_{39}$ is set at 30,000 ohms, branch current $$I_2 = \frac{3}{100}\left[\frac{30,000 + 30,000}{30,000}\right] = .06 \text{ amp.}$$

and load current equals 60.1 milliamps. When $R_{39}$ is set at 70,000 ohms, branch current $$I_2 = \frac{3}{100}\left[\frac{30,000 + 70,000}{30,000}\right] = 0.1 \text{ amp.}$$

and load current $I_L$ equals 100.1 milliamps. Regardless of the setting of $R_{39}$, branch current $I_1$ remains constant at 0.1 milliamp, Equation 1, for the various values of $I_2$ and corresponding load currents $I_L$. From the foregoing, it is seen that $I_2$ and $I_L$ vary linearly with selected values of $R_{39}$ and also that the value of $I_1$ is very small compared to $I_2$ and corresponding values of $I_L$. It will be noted that for a branch current error of 0.1% in $I_1$, that this works out as a 1 part per million error of load current at full scale.

The accuracy and stability characteristics of the divider network made up of resistors 35, 38, 39 and cell 40 may be better appreciated by the following analysis from Equations 3, 4 and 5, $I_L$ at balance is:

$$I_L = \frac{E}{R_{38}} + \frac{E + E\frac{R_{39}}{R_{38}}}{R_{35}} = \frac{E}{R_{38}} + \frac{E}{R_{35}} + \left(\frac{E}{R_{35}}\right)\left(\frac{R_{39}}{R_{38}}\right) \quad (6)$$

The ratio $E/R_{35}$ appears in the second and third terms of Equation 6 and is made up of two primary standards of 1 part per million accuracy and stability characteristics. This means that the ratio $E/R_{35}$ is an absolute constant. The ratio $R_{39}/R_{38}$ appears in the third term and is made up of the two similar composition precision resistors. The value and stability of this ratio can be made highly accurate. It is preferable to use a resistance ratio decade to provide the value of the ratio $R_{39}/R_{38}$. Errors in the numerator and denominator of the ratio rheostat, which errors would individually detract from the 1 part per million stability and precision characteristics of the monitoring network, are not cumulative, but tend to cancel out.

In other words, the individual resistors $R_{38}$, $R_{39}$ will drift in the same direction. The ratio $E/R_{38}$ is the first term and is made up of a primary standard over a precision resistor. This value represents the least stable term of the system. However, its value is designed to comprise a very small part of the load current, i.e. $\frac{1}{1000}$ of $I_L$. Resistors making up $R_{38}$ can be accurate and stable well within and better than 1 part per thousand for state of the art high production decade resistors. Hence, if stability of $R_{38}$ is better than 1 part per thousand accurate and $I_1$ is in the order of $\frac{1}{1000}$ of $I_L$, then system accuracy and stability of 1 part per million is maintained. The curve of Equation 6 is shown in FIG. 3. This clearly depicts other advantages of the invention. Load current $I_L$ is regulated by varying $R_{39}$. The relationship is linear and also in the same "sense," i.e. an increasing value of $R_{39}$ increases $I_L$ and a decreasing value of $R_{39}$ decreases $I_L$. Furthermore, since the series combination of $R_{38}$ and variable $R_{39}$ (normally high values of resistance) are designed for low current and power capacities, it will be appreciated that the resistance errors normally introduced by the switching contacts for varying $R_{39}$ are substantially minimized to negligible values or practically eliminated. This is not so with prior art systems wherein the variable regulating element of low resistance and the switching contacts thereof are required to carry the heavy load current. It will be noted hereinafter in greater detail that the resistances $R_{38}$, $R_{39}$ may be provided by the same rheostat ratio decade. Hence, the combination constitutes a relatively high resistance design to carry low current loads which is in the proper direction to minimize switch contact resistances. The problem of switch contact resistances does not arise with the low value and high current carrying resistor $R_{35}$ because this resistor is fixed in value for any selected current in the operating range, i.e. 30.1 milliamps to 100.1 milliamps.

To simplify the circuitry and network operation of FIG. 2, a rheostat may be used to provide resistor values from zero to 100,000 ohms. Such rheostat would have a stop at the 30,000 ohm point so that the first 30,000 ohms serve as the primary absolute resistor 38; whereas, the remainder of the 70,000 ohms serve as the ratio divider rheostat 39. Furthermore, the dial settings for such rheostat may be calibrated to provide direct readings of current in preselected steps, i.e. from 0.0301 amp to 0.1001 amp in accordance with the insertion or removal of portions of the 70,000 ohm resistance. If the calibrated scale readings of 30.1 ma. . . . 60.1 ma. . . . 100.1 ma. are awkward because of the odd factor of .1 ma., the rheostat increments for $R_{39}$ may be selected to provide load current settings of even numbers, such as 30.0 ma. . . . 60.0 ma. . . . 100.0 ma. This requires calculation of the values of $R_{39}$, or the ratio of $R_{39}/R_{38}$, from Equation 6, for the corresponding values of $I_2 = 29.9$ ma. . . . $I_2 = 59.9$ ma. . . . $I_2 = 99.9$ ma. with $E = 3$ volts; $R_{35} = 100$ ohms; and $R_{38} = 30,000$ ohms, whereby $R_{39}$ is now stepped in accordance with such calculated resistances.

In operation, resistor 30 in the emitter circuit of transistor 27 may be manually regulated to provide a coarse adjustment of load current after a desired current setting is dialed into ratio divider means 39, preferably with resistor 33 initially set at mid-position. Thereafter, the network of FIG. 2 will provide the preset D.C. current. Any drift in the circuit during operation is corrected by the self-regulating means comprising amplifier-servo 42, feedback 43 and bias regulator 33. For example, when a specific current is desired, such as 0.0601 amp, ratio divider 39 is set at 30,000 ohms (reference is made to the parameters of the example described hereinbefore). The scale or dial for this reading will actually read 0.0601 amp. Emitter resistance 30 is adjusted to null meter device 41 with trim resistor 33 at mid-position. Fine adjustment is automatic through the foregoing described feedback means, whereby 0.0601 amp flows through the load while null is maintained at 41.

If a different level or range of load current is required, a primary standard resistor 35 of suitable value in accordance with Equation 6 is substituted in place of the 100 ohm resistor $R_{35}$. For example (reference is again made to the example parameters described hereinbefore), a standard resistor of 50 ohms will provide a full scale reading of 0.201 amp. It will be noted that the values of $R_{38}$ and $R_{39}$ remain as indicated hereinbefore. A resistor 35 of 1,000 ohms will provide a full scale reading of 10.1 milliamps. Similarly, a change of the parameter values of the rheostat constituting resistances 38, 39 also will shift the current level provided by the circuit.

In order to facilitate a change of load current level or range of operation without the complete removal of resistor 35 and the replacement of same by another resistor, the resistor means of FIGS. 4 through 6 may be employed. These figures illustrate a mercury conductance standard 49 consisting of two current conducting terminal bodies 50, 51 having individual connecting terminal posts 50a, 51a. Each terminal body 50, 51 has a longitudinal trough filled with mercury 52. The mercury conductance standard 49 is made up of individual primary standard resistors 53, 54 . . . 57. Each resistor is suitably encapsulated in accordance with the art and is provided with a pair of oppositely turned pigtails 58, 59 suitably disposed so that upon lowering of the individual resistor, the pigtails thereof immerse into the mercury of the respective terminal bodies 50, 51. FIG. 4 illustrates conductance means 49 with five primary standard resistors in parallel.

FIGS. 5 and 6 illustrate the operation of the mercury conductance standard 49 by means of lifting and dropping the individual primary standard resistors 53 . . . 57 one at a time from an inactive "up" position to an active "down" position, or the converse, so as to increase and decrease the total resistance of same. The device is suitably encased in an outer shell 60 having vertical pockets 61 to receive and house a corresponding one of the resistors 53 . . . 57 when such resistor is in raised status. A wedge body 62 has an inclined surface 63 and is adapted to slide under the individual resistors 53 . . . 57. Wedge body 62 is guided between insulated tracks 64 to provide longitudinal travel of body 62 to the left and right as viewed in FIG. 6, which travel is imparted thereto by rotation of a threaded shaft 65. The outer thread of shaft 65 engages a stationary collar 66 having an internal diameter thread. The inner end of shaft 65 is provided with a flange 67 held in an interior recess 68 of wedge body 62 under an arrangement whereby flange 67 is free to rotate in recess 68 as shaft 65 turns. Consequently, the foregoing arrangement is such that rotation of shaft dial 69 in one or the other of its two directions about the shaft axis will result in righthand or lefthand longitudinal motion of wedge body 62. When shaft 65 is fully withdrawn to the left, the narrow end 70 of wedge body 62 is under resistor 53, whereby the pigtails of the five resistors are immersed in the mercury filled troughs 52, 52 so that the aggregate resistance of standard 49 is a minimum. This is indicated by the first scale marking on dial 69. When wedge body 62 travels inwardly to the right, resistor 53 is raised by surface 63 so that when dial 69 reaches its next scale marking, the pigtails 58, 59 of resistor 53 are withdrawn from mercury filled troughs 52, 52 to leave only four parallel resistors 54 . . . 57 connected across terminal bodies 50, 51. Further travel of wedge 62 to the right will successively raise each resistor, one at a time, which is indicated by successive dial markings of the dial scale 69 so as to increase the resistance of standard 49 step-by-step. Once a resistor is raised, it remains held in raised status as wedge 62 continues its motion in the direction which previously raised the resistor. Conversely, withdrawal of wedge 62 to the left allows the individual resistors to drop, one at a time, to make parallel connection across terminal bodies 50, 51.

FIG. 7 illustrates a second embodiment of a D.C. current source in accordance with the principles of the invention. This embodiment employs two current divider networks. In particular, the first of such networks is a current monitor and regulator employed for the same purpose as its counterpart shown in FIG. 2. Thus it is subject to the foregoing description of the FIG. 2 circuit and its elements are given the same reference numbers as its counterparts of FIG. 2 with the FIG. 7 elements primed. The monitoring divider network in FIG. 7 includes a primary standard resistor 35' of fixed relatively low resistance and a resistive branch made up of a precision resistor 38' of fixed relatively high resistance connected to a precision resistor rheostat 39', wherein branch 38'–39' bridges resistor 35'. The potential at junction 34' is balanced against the standard voltage E' provided by cell 40'. The difference voltage, if any, is sensed by detector-amplifier meter device 41'. A signal proportional to the magnitude and phase of the difference voltage is fed to servo means 42' to provide an output error signal $E_r'$ for adjusting the position of an arm 80 of a potentiometer 81 in the bias circuit of transistor 27'. The load is applied across terminals 28', 29'. Equation 6 as described hereinbefore applies to this monitoring divider.

The second current divider network in FIG. 7 involves a fixed resistor 82 of relatively low resistance connected at one end to the emitter of transistor 27' and at the other end to load terminal 28'. A fixed resistor 83 of relatively high resistance is connected at junction 84 to a rheostat 85 to define a resistance branch bridging resistor 82. The value of $R_{82}$ is relatively small, whereby branch current $I_{22}$ is almost equal to the load current. The value of $R_{83}$ is relatively high, hence branch current $I_{11}$ is a very small current. A fixed D.C. reference voltage, battery 86, is connected across potentiometer 81. The negative terminal of battery 86 is connected to junction 84 to provide forward bias for transistor 27'. Therefore, the potential rise from junction 84 through resistor 83 to emitter junction 87 is less than the potential rise from junction 84 through potentiometer 81, to arm 80, to the base of transistor 27'. The position of arm 80 along rheostat resistor 81 regulates the bias so as to increase or decrease the amount of emitter current supplied to the load.

The parameters of the transistor network are selected to provide an emitter current substantially equal to the desired load current. The final adjustment of emitter current whereby it accurately coincides with the desired current is achieved by the preset current established at the lower current monitoring network through its feedback servo adjustment of the emitter-base bias at arm 80. Normal operation of transistor 27' may be deemed as providing fast acting current regulation which when switched on initially provides an emitter current at least approximately equal to the desired load current. The small percentage of error, if any, that may subsist after transistor equilibrium is realized, is then regulated out by the relatively slower responding monitoring circuit which provides the feedback servo signal $E_r$. As noted before, this signal adjusts the emitter bias circuit in a direction to lock the load current to the preset value of $I_L$ as determined by the monitoring network and Equation 6. From the foregoing, it will be understood that the parameters o fthe divider network elements 82, 83, the ratio 85/83 and 86 need not be characterized by the extreme accuracies and stabilities as specified for the monitoring network elements 35', 38', the ratio 39'/38' and 40'. Rheostats 39' and 85 vary in the same direction to regulate load current, i.e. load current increases or decreases as $R_{39}'$ and $R_{85}$ icreases or decreases, respectively. Hence, $R_{39}'$ and $R_{85}$ may be ganged as depicted by the dashed line, whereby both can be stepped together to arrive at their respective values for a preset load current. It will be understood that transistor 27' may be replaced by an equivalent high-gain control regulator without departing from the principles of the invention.

The current monitoring network depicted in FIG. 2 is capable of serving as a highly precise direct current measuring device and is so illustrated in FIG. 8. Assume that reference 90 depicts an electrical network having a line 91 carrying a current $I_u$, current under test, and that an accurate measurement of such current is desired. Line 91 is connected to the ends of a fixed resistor 135 of the measuring network. Resistor 135 corresponds to resistor 35 of FIG. 2. The measuring network also includes fixed resistor 138, rheostat 139, voltage cell 140 and amplifier-detector means 141. The foregoing units correspond to elements 38, 39, 40 and 41, respectively, of FIG. 2. The operation of the network and the parameter values for elements 135, 138, 139 and 140 are controlled by the same explanation set forth in the development of Equations 1 through 6. The output of device 141 is fed to a suitable meter 142. Therefore, it will be understood that the value of $R_{135}$ is very much less than the vale of $R_{138}$ and the branch current through $R_{135}$ is very much greater than branch current through rheostat $R_{139}$. The values for $R_{135}$, $R_{138}$, $R_{139}$ and $E_{140}$ are selected in accordance with Equation 6 to balance for the desired value of $I_u$. Rheostat 139 is dialed to such calculated value. The potential at junction 134 will be in balance if the measured current in line 91 is equal to the preset value. Meter 142 may be calibrated to indicate the value of $I_u$ upon a zero error signal being fed to device 141, or it may point to a "zero" reading to indicate that the measured current in line 91 accurately equals its preset value. If the actual value of current in line 91 differs from that determined by the parameters of the measuring network, a difference signal will be fed to device 141, whereby meter 142 will indicate the magnitude and the sense of the error. On the other hand, if one only wants to know the value of the actual current flow in line 91, then rheostat $R_{139}$ is adjusted until meter 142 indicates a null. This value of current is then calculated from the values for $R_{135}$, $R_{138}$, cell 140, and the new setting for $R_{139}$ which brought meter 142 to a null position.

It is intended that all matter contained in the above description or shown in the accompanying drawings shall be interpreted as illustrative and not in a limiting sense.

What is claimed is:

1. A direct current source comprising, means for supplying direct current power, an output circuit having output terimnals across which an electrical load is connected for receiving a preselected load current supplied by the direct current source, first primary standard resistor means of a selected fixed resistance connected in series with said output circuit, second resistor means of selected fixed resistance, rheostat means connected in series with said second resistor means to form a current conducting resistance branch, said resistance branch being connected to bridge said first standard resistor means, the relative values of resistance of said first resistor means with respect to the resistance of said branch being selected to result in a substantial portion of the load current to flow through said first standard resistor means and whereas the balance of said load current of relatively very small value flows into said resistance branch, and means for monitoring a voltage potential across said second resistor means to maintain a preselected voltage potential thereacross and for stabilizing said load current, whereby the preselected value of load current is directly dependent upon the preset value of resistance selected for said rheostat means.

2. A source as defined in claim 1 further including, means in said output circuit for regulating load current flow, said monitoring means including a direct current primary standard reference of preset voltage, means for comparing the voltage potential across said second resistor means against said reference voltage, and means for actuating said regulating means to balance said voltage potential against said preset reference voltage by varying the amount of load current flow, whereby a preselected value of load current is applied to said load when the aforesaid balance is maintained.

3. A source as defined in claim 2 wherein, said output circuit regulating means comprising a high gain control amplifier.

4. A source as defined in claim 2 wherein, said regulating means including adjustable D.C. resistor means in said output circuit for functioning as a current control valve in series with the load.

5. A source as defined in claim 2 wherein, said D.C. reference being connected to the junction of said second resistor means and said rheostat, said comparing means serving to sense the voltage drop across said second resistor means against said D.C. reference voltage for providing an error signal when said voltage drop does not balance against said D.C. reference.

6. A source as defined in claim 1 wherein, said second resistor means and said rheostat means being a ratio decade formed of similar composition precision resistors, whereby the ratio of said rheostat to said second resistor means is an absolute value of high stability and accuracy, and wherein the relative values of resistances are selected so that the small branch current is in the order of $\frac{1}{1000}$ of load current.

7. A source as defined in claim 1 further including, means in the output circuit for regulating the amplitude of the load current flow, a third resistor of fixed resistance connected between said regulating means and said load, a fourth resistor of fixed resistance connected to a second rheostat to define a second resistive branch for controlling the current flow through said second resistive branch, said second resistive branch being connected across said third resistor, the relative values of said third and fourth resistors being selected to result in a substantial portion of the load current to flow through said third resistor and a small branch current to flow through said second resistive branch, said regulating means functioning as a current valve to control the magnitude of load current in accordance with the magnitude of a biasing signal applied to said regulating means, and a voltage comparison circuit connected to the junction of said fourth resistor and said second rheostat in said second resistive branch for providing a biasing signal voltage to said regulating means, whereby said regulating means provides coarse load current regulation resulting in a current flow equilibrium substantially equal to the preselected value of load current and wherein fine trim regulation to provide a load current accurately equal to said preselected value is provided by means including said first primary standard resistor means and the first-mentioned resistance branch bridging same.

8. A variable direct current source comprising, means for supplying direct current power, an output circuit having output terminals across which an electrical load is connected for receiving a preselected load current supplied by the variable direct current source, first standard resistor means of a selected fixed resistance connected in series with said output circuit, second resistance means of selected fixed resistance, rheostat means connected in series with said second standard resistor means to form a current conducting resistance branch, said resistance branch being connected to bridge said first standard resistance means, the relative values of resistance of said first resistor means with respect to the resistance of said branch being selected to result in a substantial portion of the load current to flow through said first standard resistor means, whereas the balance of load current branches off into said resistance branch, a direct current reference of fixed preset voltage, means for comparing the voltage potential across said second resistor means against said reference voltage for maintaining a preselected voltage potential across said second resistor means and also for providing an error signal when the compared voltages are not in balance, and means in said output circuit for regulating the value of said load current in response to said error signal to maintain voltage balance, whereby the preselected value of load current is a function of the preset value of resistance selected for said rheostat means.

9. Means for monitoring a uni-directional current comprising, a first resistor of fixed resistance coupled in series with the transmission line carrying the current under test, a second resistor of fixed resistance, rheostat means connected in series with said second resistor to form a current conducting resistive branch, said branch being connected across said first resistor to define a current divider network, the relative values of resistance of said first and second resistors and said rheostat resulting in a substantial portion of the current under test to flow through said first resistor and the balance of said current to flow into said resistive branch, said first and second resistors and said rheostat having values whereby the current equation for said network provides the calculated value for the current under test at a particular setting for said rheostat, said setting also providing a predetermined voltage across said second resistor in said resistive branch, and means for monitoring the aforesaid voltage across said second resistor to ascertain whether the current under test equals the calculated value thereof.

References Cited by the Examiner
UNITED STATES PATENTS

| | | | |
|---|---|---|---|
| 2,337,973 | 12/1943 | Cole et al. | 201—63 |
| 2,375,213 | 5/1945 | Chilton | 323—79 |
| 2,740,028 | 3/1956 | Buckman | 201—62 |
| 2,925,549 | 2/1960 | Daniel | 323—66 |
| 3,028,538 | 4/1962 | Rosenfeld et al. | 323—22 |
| 3,080,517 | 3/1963 | Borkovitz | 323—66 |

LLOYD McCOLLUM, *Primary Examiner.*

A. D. PELLINEN, D. L. RAE, *Assistant Examiners.*